F. H. Bartholomew,
Water Closet,
N°. 33,632. Patented Nov. 5, 1861.
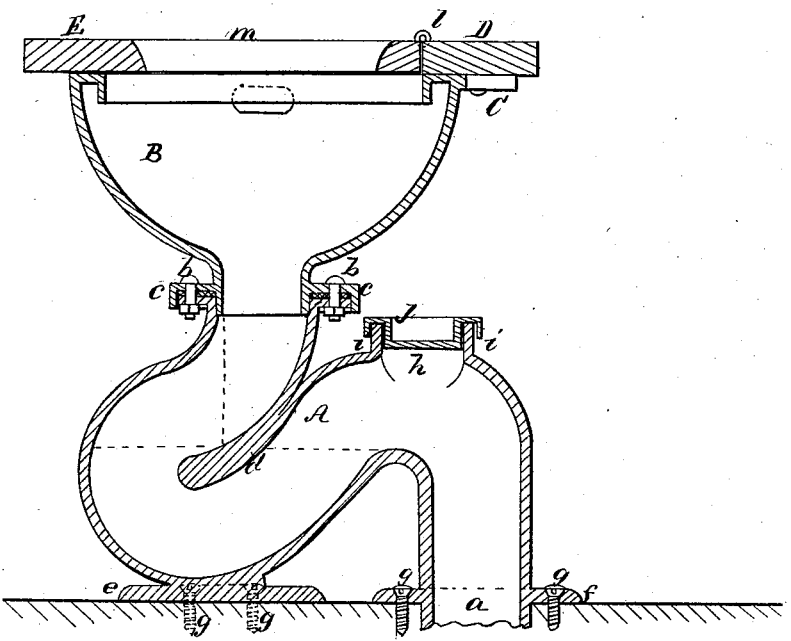
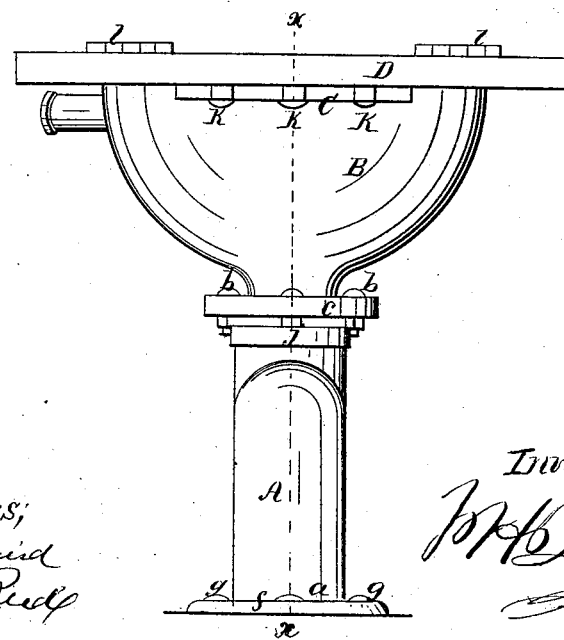

UNITED STATES PATENT OFFICE.

F. H. BARTHOLOMEW, OF NEW YORK, N. Y.

IMPROVED WATER-CLOSET.

Specification forming part of Letters Patent No. 33,632, dated November 5, 1861.

*To all whom it may concern:*

Be it known that I, F. H. BARTHOLOMEW, of the city, county, and State of New York, have invented a new and Improved Water-Closet; and I do hereby declare that the following is a full, clear, and exact description of the same, reference being had to the accompanying drawings, making a part of this specification, in which—

Figure 1 is a back elevation of my invention; and Fig. 2, a vertical central section of the same, taken in the line $x\ x$, Fig. 1.

Similar letters of reference indicate corresponding parts in the two figures.

This invention relates to an improved water-closet of that class which are provided with metal hoppers attached directly to the trap.

The object of the invention is to so combine and arrange a hopper, trap, trap screen or opening, and floor-flange that the trap may be secured to the floor and made to serve the double function of a trap and a stand or support for the hopper, the trap at the same time admitting of being cleansed when necessary with the greatest facility.

The invention also has for its object the attaching of the wooden seat to the hopper in such a way that no other support will be required, and the whole device thereby rendered capable of being put up or adjusted for use independent of extraneous fixtures or framing hitherto required to sustain the seat.

The invention has further for its object the concealment of the contents of the trap—a desirable feature in using the water-closet.

To enable those skilled in the art to fully understand and construct my invention, I will proceed to describe it.

A represents the trap of the water-closet. This trap is of cast-iron and is curved, as shown clearly in Fig. 2, $a$ being the end to which the soil-pipe is attached.

B is the hopper, which is secured to the upper end of the trap by means of bolts $b$, passing through flanges $c$, as shown clearly in Fig. 2. The hopper may be of the usual form and dimensions.

The trap A, although of cast metal, resembles a bent tube and approximates to the form of the letter S in a horizontal position, the upper side of the curvature, which is designated by $d$, forming what may be termed a "screen" or "partition," in consequence of projecting forward beyond the lower or discharge end of the hopper, as shown clearly in Fig. 2. This screen or projection effectually conceals the contents of the trap from an observer above, as particles floating on the water in the trap will be in front of and out of line with the bottom or discharge end of the hopper.

The lower part of the trap A is provided with two flanges $e\ f$, one $e$ being at the curvature or bend and the other $f$ at the end of the trap where the soil-pipe is attached. The trap is secured to the floor by bolts or screws $g$, which pass through said flanges.

At the upper part of the trap A, just back of the hopper B, there is an opening $h$ of circular form and encompassed by an upright flange $i$, which receives a cap or lid $j$. The opening $h$ may be equal in diameter to the trap A, and by removing the cap or lid $j$, which may be screwed or otherwise fastened on the flange $i$, the trap may be very readily cleansed whenever required. The opening $h$ is an essential feature when used in connection with the cast-metal trap A, secured to the floor, as said opening obviates the necessity in case of cleaning of removing or detaching the trap from the floor or the hopper from the trap. The trap, it will be seen, besides performing its usual legitimate function, serves as a stand or support for the hopper, no other being required.

At the upper part of the hopper B, at its back part, there is a horizontal flange C. To this flange C a wooden strip D is secured by screws or bolts $k$. To the front edge of the strip D the seat E is attached by hinges $l$. The seat is of wood provided with the usual hole $m$, which is directly over the hopper B. By this arrangement it will be seen that the seat is directly connected to the hopper B, and no extraneous framing or fixtures of any kind are required to support it. The device as a whole is therefore rendered very compact and capable of being put up or adjusted for use in any locality with the greatest facility.

Having thus described my invention, what I claim as new, and desire to secure by Letters Patent, is—

1. The combination of the trap A, hopper B, opening $h$, provided with the cap or lid $j$, and the flanges *e f*, either or both at the lower part of the trap, all being arranged substantially as and for the purpose set forth.

2. The flange C, for the attaching of the seat E directly to the hopper B, when said hopper is attached to a trap A, which serves the twofold purpose of a trap and stand or support, as set forth.

3. Constructing or casting the trap A in the form substantially as shown and described, to-wit: having it so curved that a screen or partition *d* will project forward in front of the lower or discharge end of the hopper B for the purpose of concealing the contents of the trap, as described.

F. H. BARTHOLOMEW.

Witnesses:
JAMES LAIRD,
RICHARDSON GAWLEY.